US012149559B1

(12) United States Patent
Fullen et al.

(10) Patent No.: US 12,149,559 B1
(45) Date of Patent: Nov. 19, 2024

(54) REPUTATION AND CONFIDENCE SCORING FOR NETWORK IDENTIFIERS BASED ON NETWORK TELEMETRY

(71) Applicant: Amazon Technologies, Inc., Seattle, WA (US)

(72) Inventors: Wayne Alan Fullen, Falls Church, VA (US); Patrick Collard, Arlington, VA (US); William Kupersanin, Pasadena, MD (US); Michael Lowney, Arlington, VA (US); Jared Sylvester, Ellicott City, MD (US); Catherine Watkins, Baltimore, MD (US); Stephen Goodman, Owings Mills, MD (US); Ravi Karnam, Novi, MI (US); Jacob Nguyen, Annandale, VA (US); Luke Kenneth Schubert, Edgewater, MD (US); Elisabeth Margaret Nagy, Dover, MA (US); Evripidis Paraskevas, Washington, DC (US); John Paul Schweitzer, Virginia Beach, VA (US); Sai Srinivas Vemula, Frederick, MD (US)

(73) Assignee: Amazon Technologies, Inc., Seattle, WA (US)

(*) Notice: Subject to any disclaimer, the term of this patent is extended or adjusted under 35 U.S.C. 154(b) by 232 days.

(21) Appl. No.: 17/850,934

(22) Filed: Jun. 27, 2022

(51) Int. Cl.
*H04L 9/40* (2022.01)

(52) U.S. Cl.
CPC ........ *H04L 63/145* (2013.01); *H04L 63/1416* (2013.01); *H04L 63/1491* (2013.01); *H04L 63/166* (2013.01)

(58) Field of Classification Search
CPC .............. H04L 63/145; H04L 63/1416; H04L 63/1491; H04L 63/166
See application file for complete search history.

(56) References Cited

U.S. PATENT DOCUMENTS

| 11,050,787 | B1* | 6/2021 | Sharifi Mehr | ...... G06F 9/45558 |
| 11,528,201 | B1* | 12/2022 | Richards | ............... H04L 43/062 |
| 2016/0099853 | A1* | 4/2016 | Nedeltchev | ......... H04L 43/0888 |
| | | | | 370/253 |
| 2018/0278629 | A1* | 9/2018 | McGrew | ............. H04L 63/1416 |
| 2019/0260663 | A1* | 8/2019 | Pueblas | .................. H04L 41/16 |
| 2019/0297402 | A1* | 9/2019 | Anderson | ........... H04L 63/1441 |

(Continued)

*Primary Examiner* — Yonas A Bayou
(74) *Attorney, Agent, or Firm* — Athorus, PLLC (57) ABSTRACT

Described are systems and methods for determining a reputation score and/or a confidence score for a network identifier that represents, respectively, a likelihood that the network identifier presents a threat and/or a likelihood that the network activity associated with the network identifier corresponds to a port scanning, enumeration, or other malicious event. Embodiments of the present disclosure can utilize various network telemetry information, such as authentication activity, outbound traffic activity, web activity, honeypot connection activity, or network classification information to determine the reputation and/or confidence scores in response to a query/request and/or in connection with potentially malicious activity that can represent a likelihood that the detected potentially malicious activity is malicious/legitimate and the potential impact that remediation measures taken against the network identifier may have in the event that the detected network activity was legitimate.

20 Claims, 6 Drawing Sheets

(56) References Cited

U.S. PATENT DOCUMENTS

| | | | |
|---|---|---|---|
| 2020/0162339 A1* | 5/2020 | Vejman | H04L 43/026 |
| 2020/0296007 A1* | 9/2020 | Finn, II | H04L 41/145 |
| 2021/0144455 A1* | 5/2021 | Anderson | H04L 63/1441 |
| 2023/0109926 A1* | 4/2023 | Nair | G06F 21/552 |
| | | | 726/25 |
| 2023/0111304 A1* | 4/2023 | Thomas | H04L 63/1416 |
| | | | 726/23 |
| 2023/0113621 A1* | 4/2023 | Griffin | H04L 63/1441 |
| | | | 726/23 |
| 2023/0247048 A1* | 8/2023 | Samosseiko | H04L 63/1425 |
| | | | 726/23 |

* cited by examiner

REPUTATION AND CONFIDENCE SCORING FOR NETWORK IDENTIFIERS BASED ON NETWORK TELEMETRY

BACKGROUND

With the continuous expansion and adoption of computing technology, digital platforms, cloud computing, and the like, the threat of malicious activity is also nearly always present. For example, malicious actors and/or cybercriminals may also attempt to enumerate certain networks to detect vulnerabilities that they may attempt to exploit. Such enumeration attempts may take the form of port scanning, brute-force attacks, credential stuffing attacks, and the like. Upon detection of suspected enumeration attempts, certain remediation actions may be taken. For example, certain network traffic may be blocked (e.g., TCP block, block on IP, block HTTP/HTTPS requests, and the like) in response to a detection of a suspected enumeration event. Although the remediation actions may prevent further harm to the network, in the event that the suspected enumeration attempt was actually legitimate traffic, i.e., the detection of the suspected enumeration attempt was a false positive, the remediation actions may impact legitimate activity. Accordingly, in addition to detecting and/or assessing potentially malicious activity, it may be prudent to ascertain the reputation associated with certain networked resources.

DETAILED DESCRIPTION

As is set forth in greater detail below, embodiments of the present disclosure are generally directed to systems and methods for determining a reputation and/or confidence score for a network identifier. The reputation and/or confidence score may be determined in connection with a query received in connection with the network identifier, detection of potentially malicious activity associated with the network identifier, and the like. The reputation score may represent a likelihood that the network identifier may present a threat, and the confidence score may represent a likelihood that the network activity associated with the network identifier corresponds to a port scanning, enumeration, or other malicious event. In determining the reputation and/or confidence score, exemplary embodiments of the present disclosure may consider network activity associated with the network identifier that may be indicative of potentially malicious activity, as well as network activity that may be indicative of legitimate network traffic and/or may be representative of a potential impact that any responsive remediation measures (e.g., a TCP block, blocking on the network identifier, blocking HTTP/HTTPS requests, and the like) may have on legitimate activity.

According to exemplary embodiments of the present disclosure, network telemetry information for various network identifiers communicating with a networked computing platform, such as a cloud computing platform, etc., may be collected and stored in one or more datastores. For example, authentication activity, outbound traffic activity, web activity, honeypot connection activity, network classification information, third-party and/or historical information, and the like, associated with various network identifiers may be periodically obtained, stored, and maintained in one or more datastores. The stored network telemetry information may then be analyzed and/or processed to generate network telemetry features associated with the authentication activity, outbound traffic activity, web activity, honeypot connection activity, network classification information, and/or third-party and/or historical information, which may then be utilized to determine a reputation and/or confidence score representing a likelihood that a network identifier may pose a threat and/or network activity associated with a network identifier is malicious/legitimate and the potential impact that remediation measures taken against the network identifier may have in the event that the detected network activity was legitimate.

In an exemplary implementation of the present disclosure, a request for a reputation and/or confidence score for a network identifier may be received. The request may include, for example, an indication that potentially malicious activity has been detected in connection with a particular network identifier, a query to obtain information in connection with activities associated with the network identifier, a request to determine a reputation associated with the network identifier, and the like. Upon receipt of the network identifier, network telemetry information associated with the network identifier may be dynamically accessed and retrieved from the one or more datastores storing the compiled network telemetry information, in real-time. For example, network telemetry information may be obtained for certain time periods prior to and/or following the network activity that triggered the detection and identification of potentially malicious activity. The retrieved network telemetry information may be processed by a reputation and/or confidence scoring engine to determine a reputation score and/or a confidence score associated with the identified network identifier. According to certain aspects of the present disclosure, the network telemetry information may be analyzed and/or processed prior to being provided to the reputation and/or confidence scoring engine to generate network telemetry features. Alternatively and/or in addition, the network telemetry information may be analyzed and/or processed by the reputation and/or confidence scoring engine to generate network telemetry features. Based on the request associated with the network identifier, one or more of a reputation score, a confidence score, the network telemetry information, and/or the network telemetry features may be provided in response to the request. For example, the reputation score and/or confidence score may be provided to additional downstream services and/or systems to determine whether and/or the type of remediation actions that are to be taken in view of the provided confidence score. Alternatively and/or in addition, the network telemetry information and/or the network telemetry features may be provided in response to the request and/or query to additional downstream services and/or systems for further processing and/or assessment.

Advantageously, exemplary embodiments of the present disclosure can augment and improve traditional methods that may have been employed in reputation scoring and/or the detection of malicious activity, such as port scanning and/or enumeration attempts on a network. In the described implementations, certain specific network telemetry information (e.g., authentication activity, outbound traffic activity, web activity, honeypot connection activity, network classification information, and the like) associated with a network identifier over a defined time period may be applied and utilized in determining a reputation score and/or confidence score in connection with the network identifier and/or the detection of potentially malicious activity. The network telemetry information utilized by exemplary embodiments of the present disclosure to determine the reputation score and/or confidence score can indicate a likelihood of a threat posed by the network identifier and/or the potential impact that remediation actions may have on legitimate activity, while also indicating the likelihood that the detected activity is malicious. Further, although the exemplary embodiments are primarily described in connection with the determination of confidence scores, one of ordinary skill in the art would understand that the present disclosure may be applicable to other implementations in connection with reputation scoring and/or services, other data sources and/or enrichments, and the like.

Figure 1:
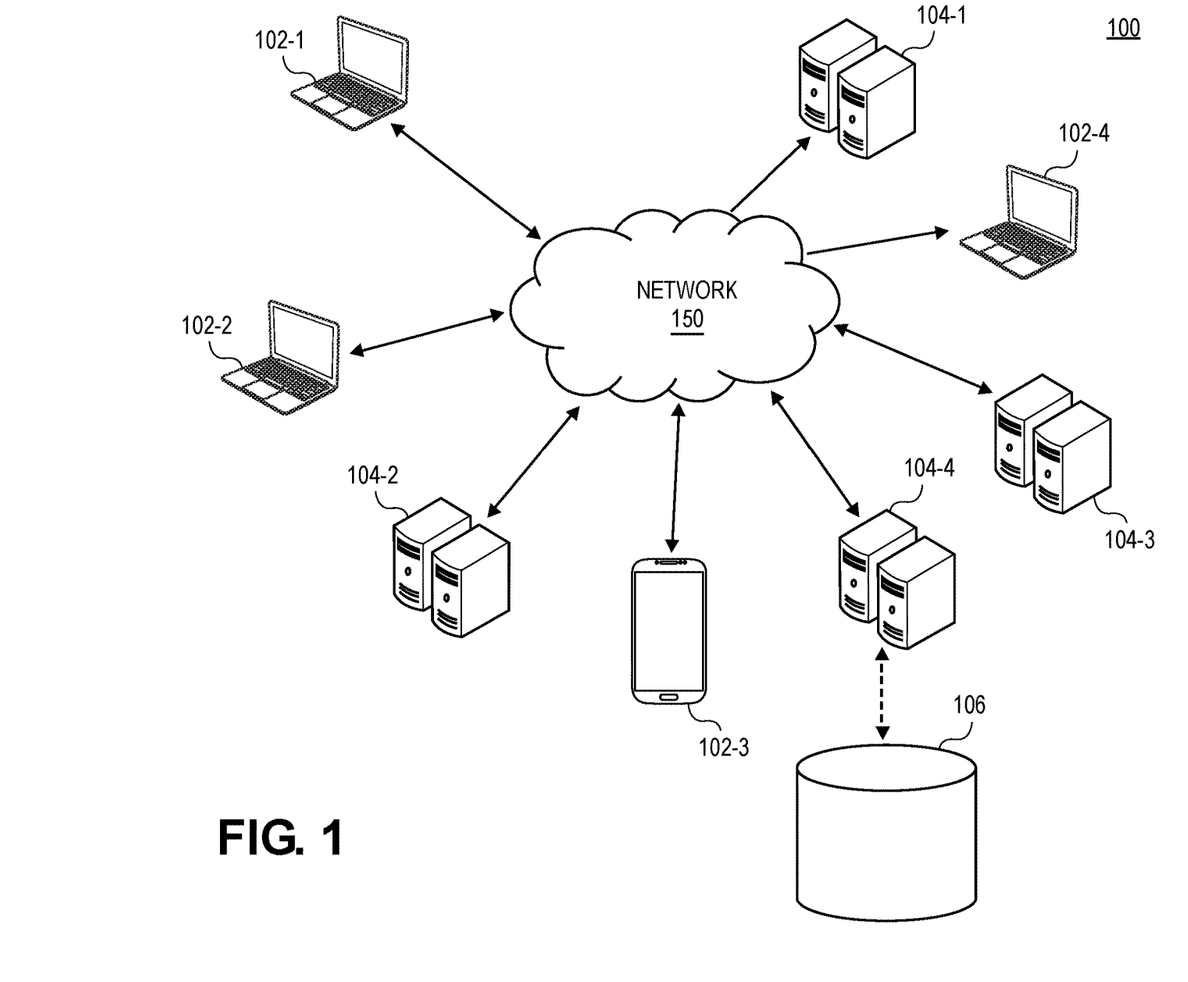
FIG. 1 is an illustration of an exemplary computing environment, according to exemplary embodiments of the present disclosure.

FIG. 1 is an illustration of an exemplary computing environment 100, according to exemplary embodiments of the present disclosure.

As shown in FIG. 1, computing environment 100 may include one or more client devices 102 (e.g., client device 102-1, 102-2, 102-3, and 102-4), also referred to as user devices, for connecting over network 150 to access online applications, services, computing platforms, servers, and the like, which may be executing on remote computing resources 104 (e.g., remote computing resources 104-1, 104-2, 104-3, and 104-4). Client devices 102 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 102 and remote computing resources 104.

Remote computing resource(s) 104, and each of the other computing resources discussed herein, do not require end-user knowledge of the physical premises and configuration of the system that delivers the services. For example, remote computing resource(s) 104 may include "on-demand computing platforms," "software as a service (SaaS)," "platform computing," "network-accessible platforms," "cloud computing platforms," "data centers," "virtual computing platforms," and so forth. Further, one or more of remote computing resources may access and/or communicate with one or more datastores 106. Example components of a server that may be or be included in computing resources 104 is discussed below with respect to FIG. 6.

According to exemplary implementations of the present disclosure, computing resources 104 may be representative of computing resources that may form a portion of a networked computing platform (e.g., a cloud computing platform, and the like), which may be accessed by client devices 102. Further, computing resources 104 may access and/or communicate with one or more datastores 106, which may be configured to store and maintain various types of information and/or data. As illustrated in FIG. 1, one or more of client devices 102 may access remote computing resources 104, via network 150. While much of the activity associated with client devices 102 may be legitimate activity, some of the activity associated with one or more of client devices 102 may also access remote computing resources 104 for malicious activities, such as port scanning and/or enumeration attempts and/or events, brute-force attacks, credential stuffing attacks, and the like.

To protect against such attempts, events, and/or attacks, the networked computing platform illustrated in FIG. 1 may employ various services and/or systems to determine a risk/threat presented by client devices 102 and/or detect potentially malicious activity associated with client devices 102. According to exemplary implementations of the present disclosure, in connection with protecting against such attempts, events, and/or attacks, a reputation and/or confidence scoring service can be provided, which can facilitate determining a reputation score and/or a confidence score associated with the detection of potentially malicious activity in connection with client devices 102. The reputation and/or confidence scoring service may execute on one or more of remote computing resources 104 and may utilize certain network telemetry information in determining the reputation score and/or confidence score associated with the one or more client devices 102 and/or the detection of potentially malicious activity.

According to exemplary embodiments of the present disclosure, the reputation and/or confidence scoring service executing on one or more of remote computing resources 104 may be configured to continuously monitor, obtain, and compile network telemetry information associated with client devices 102 and store such network telemetry information in one or more datastores 106. For example, the confidence scoring service may periodically obtain and compile network telemetry information, which may include information relating to authentication activity, outbound traffic activity, web activity, honeypot connection activity, network classification information, third-party and/or historical information, and the like, associated with client devices 102. Such network telemetry information associated with client devices 102 may be periodically obtained and updated from various sources (e.g., network logging services, network monitoring services, fraud detection services, third-party network services, and the like) in batch and stored in one or more datastores 106. According to exemplary embodiments of the present disclosure, the various network telemetry information itself may be obtained and stored in one or more datastores 106. Alternatively and/or in addition, one or more of the various network telemetry information may be analyzed and/or processed to generate network telemetry features that are representative of the various network telemetry information (e.g., Boolean, probabilistic, etc. values) that may represent a likelihood of threatening, legitimate, and/or malicious activity, and the like in connection with the corresponding one or more of the various network telemetry information, and the network telemetry features may be stored in one or more datastores 106.

In response to a request (e.g., in the event that potentially malicious activity has been detected by the networked computing platform (e.g., in connection with one of client devices 102), a query associated with one of client devices 102, a request for a reputation score for one of client devices 102, and the like) received by the reputation and/or confidence scoring service in connection with a network identifier identifying one of client devices 102, the network telemetry information and/or the network telemetry features stored and maintained in one or more datastores 106 may be used to determine a reputation score and/or confidence score in response to the request (e.g., a reputation score associated with the identified client device 102 and/or a confidence score associated with the potentially malicious activity that was detected, etc.). Alternatively and/or in addition, the network telemetry information and/or the network telemetry features may be provided in response to the request and/or query. For example, a network identifier (e.g., Internet Protocol (IP) address, transport layer security (TLS) identifiers, user agents or other software agents, identifier hashes, and the like) associated with a client device 102 may be identified and obtained by the reputation and/or confidence scoring service in connection with the request. The reputation and/or confidence scoring service may be configured to determine a reputation score and/or confidence score, which may represent a likelihood that the network identifier poses a threat and/or a likelihood of maliciousness and a potential impact to legitimate activity, respectively, associated with the network identifier obtained in connection with the request.

In an example illustration, certain activity associated with client device 102-2 may be identified as being potentially malicious. Accordingly, a network identifier associated with client device 102-2 may be determined and provided to the reputation and/or confidence scoring service. Alternatively and/or in addition, the network identifier associated with client device 102-2 may be determined and provided to the confidence scoring service in connection with a query to obtain information in connection with activities associated with client device 102-2, determine a reputation associated with client device 102-2, and the like.

In response to the provisioning of the network identifier, the confidence scoring service may access and retrieve network telemetry information that had been collected in connection with the network identifier. For example, the reputation and/or confidence scoring service may access and retrieve network telemetry information and/or network telemetry features stored in datastore 106 associated with the network identifier associated with client device 102-2. The retrieved network telemetry information and/or network telemetry features may include information, such as: whether an authentication event was recorded in connection with the network identifier in a predefined time period (e.g., 1 hour, 12 hours, 24 hours, 36 hours, etc.) preceding the detection of the potentially malicious activity: whether outbound connections to certain networked resources were recorded (e.g., certain cloud computing services, applications, and the like) within a second predefined time period (e.g., 15 minutes, 30) minutes, 45 minutes, 1 hour, 2 hours, etc.) preceding the detection of the potentially malicious activity: whether web activity was recorded (e.g., HTTP and/or HTTPS connections via ports 80 and 443) within a third time period preceding the detection of the potentially malicious activity: whether connections to honeypots were recorded in a fourth time period (e.g., 15 minutes, 30 minutes, 45 minutes, 1 hour, 2 hours, etc.) preceding the detection of the potentially malicious activity: a type of network associated with the network identifier (e.g., virtual private network (VPN), The Onion Router (Tor) exit node, organizations associated with the network, etc.); third-party and/or historical information associated with the network identifier (e.g., threat level intelligence information associated with the network identifier and/or a prefix, such as an autonomous system number (ASN), crowd-sourced information associated with the network identifier, previous detections of malicious activity associated with the network identifier, previously determined reputation scores associated with the network identifier, etc.), and the like.

The reputation and/or confidence scoring service may process the retrieved network telemetry information and/or the network telemetry features with a reputation and/or confidence scoring model, which may determine a reputation score and/or a confidence score in response to the request (e.g., a reputation score associated with the network identifier and/or a confidence score associated with the detection of the potentially malicious activity based on the various telemetry information, etc.). According to certain aspects of the present disclosure, the reputation and/or confidence scoring service may process the one or more of the various network telemetry information to generate network telemetry features (e.g., Boolean and/or probabilistic values) representing a likelihood of threatening, legitimate, and/or malicious activity in connection with the corresponding one or more of the various network telemetry information, and the network telemetry features may be used in the determination of the reputation score and/or confidence score. According to exemplary embodiments of the present disclosure, the confidence scoring model may employ a rule-based technique to determine the confidence score associated with the detected potentially malicious activity. In exemplary embodiments where a rule-based model may be employed, the reputation and/or confidence scoring model may adjust an initial reputation and/or confidence score based on the retrieved network telemetry information and/or the network telemetry features. Alternatively and/or in addition, the reputation and/or confidence scoring model may also employ one or more trained machine learning models and/or other probabilistic techniques. The reputation score and/or confidence score may then be provided to additional downstream services and/or systems to determine whether and/or the type of remediation actions that are to be taken in view of the reputation score and/or confidence score.

Figure 2:
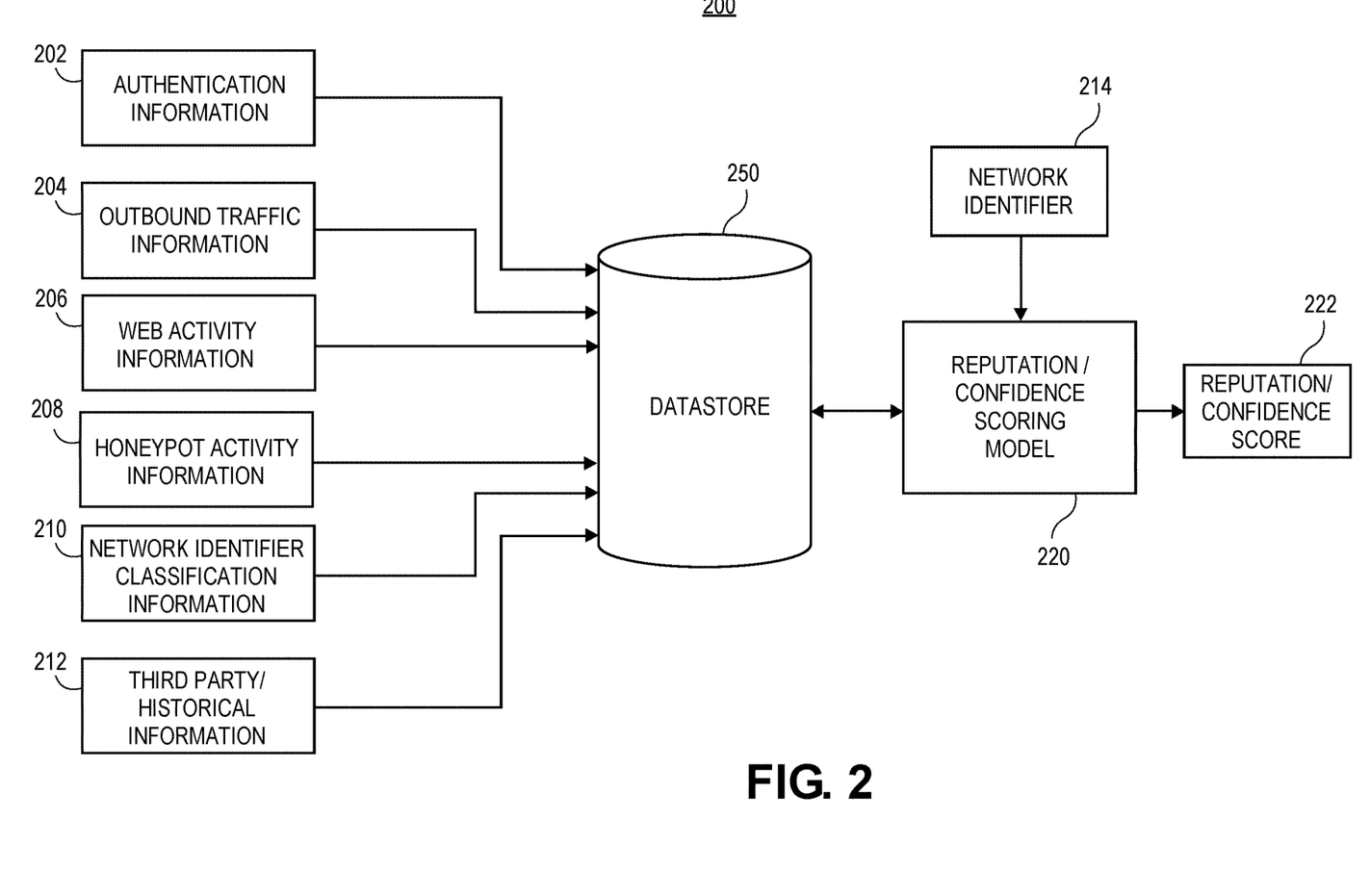
FIG. 2 is a block diagram of an exemplary reputation and/or confidence scoring service, according to exemplary embodiments of the present disclosure.

FIG. 2 is a block diagram illustrating an exemplary reputation and/or confidence scoring service 200, according to exemplary embodiments of the present disclosure.

As shown in FIG. 2, reputation and/or confidence scoring service 200 may be configured to continuously monitor, obtain, and compile network telemetry information associated with network identifiers and/or client devices accessing networked resources of a computing platform. For example, reputation and/or confidence scoring service 200 may periodically (e.g., hourly, every minute, etc.) obtain and/or update authentication information 202, outbound traffic information 204, web activity information 206, honeypot activity information 208, network identifier classification information 210, and/or third-party and/or historical information 212 in batch. The gathered network telemetry information can be stored and maintained in one or more datastores 250, which may be accessed, retrieved, and provided to reputation and/or confidence scoring model 220 to determine a reputation score and/or confidence score in response to a request associated with network identifier 214 (e.g., a reputation score associated with network identifier 214, a confidence score associated with detected potentially malicious activity in connection with a client device identified by network identifier 214, a response to a query to obtain information regarding activity and/or a reputation associated with network identifier 214, and the like). Alternatively and/or in addition, authentication information 202, outbound traffic information 204, web activity information 206, honeypot activity information 208, network identifier classification information 210, and/or third-party and/or historical information 212 may be analyzed and/or processed to generate network telemetry features, which may be stored in one or more datastores 250. Reputation and/or confidence scoring model 220 may process the retrieved network telemetry information (or network telemetry features generated from the network telemetry information) associated to determine reputation and/or confidence score 222 in connection with network identifier 214.

In an exemplary implementation, network telemetry information, such as authentication information 202, outbound traffic information 204, web activity information 206, honeypot activity information 208, network identifier classification information 210 and/or third-party and/or historical information 212 may be continuously collected and stored in one or more datastores 250. According to exemplary embodiments of the present disclosure, the stored network telemetry information may include the actual network telemetry information and/or data. Alternatively and/or in addition, one or more of authentication information 202, outbound traffic information 204, web activity information 206, honeypot activity information 208, network identifier classification information 210 and/or third-party and/or historical information 212 may be analyzed and/or processed to generate a corresponding network telemetry feature (e.g., Boolean, probabilistic, or other value) representing a likelihood that authentication information 202, outbound traffic information 204, web activity information 206, honeypot activity information 208, network identifier classification information 210 and/or third-party and/or historical information 212 indicates threatening, malicious, and/or legitimate activity, and the like. Accordingly, the corresponding network telemetry features may be stored in one or more datastores 250. Alternatively, the corresponding network telemetry features may be determined by reputation and/or confidence scoring service 200 in determining a reputation score and/or confidence score (e.g., reputation and/or confidence score 222) for a network identifier (e.g., network identifier 214). Each type of acquired network telemetry information may provide insight regarding a likelihood that certain activity associated with a client device is threatening, malicious, potentially impacting legitimate activity, and the like.

For example, authentication information 202 may include data regarding whether an authentication event (e.g., log-in, certificate authentication, etc.) was recorded in connection with a particular client device within a preceding time period (e.g., 1 hour, 12 hours, 24 hours, 36 hours, etc.). Such authentication events are often associated with legitimate activity and the presence of authentication events can indicate that remediation actions may impact legitimate activity. Outbound traffic information 204 may include information regarding outbound connections from the particular client device to certain networked resources were recorded (e.g., certain cloud computing services, applications, and the like) within a preceding time period (e.g., 15 minutes, 30 minutes, 45 minutes, 1 hour, 2 hours, etc.). For example, outbound traffic information 204 may include ratios comparing a cumulative number of bytes to a total number of connections (e.g., a relatively low number of bytes can be indicative of malicious activity since legitimate outbound traffic may typically require a relatively larger number of bytes), a number of accounts and/or instances (e.g., of a virtual machine) receiving the outbound connections, and the like. Such outbound traffic connections can also be indicative of legitimate vs. malicious activity and the presence of such outbound connections can indicate that remediation actions may impact legitimate activity. Web activity information 206 may include information regarding HTTP and/or HTTPS traffic (e.g., via ports 80/443) within a preceding time period from the particular client device. For example, web activity information 206 can include an indication of activity on ports 80/443, as well as a ratio of activity on ports 80/443 to activity on ports typically associated with port scanning activity. Such web activity can also be associated with legitimate activity and the presence of web activity can indicate that remediation actions may impact legitimate activity. Honeypot activity information 208 can include an indication of whether, and how many, connections to honeypots were recorded in a preceding time period (e.g., 15 minutes, 30 minutes, 45 minutes, 1 hour, 2 hours, etc.). Honeypot activity can indicate the likelihood of malicious vs. legitimate activity. For example, the presence of honeypot connections can be indicative of malicious activity, and the volume of honeypot activity can be directly related to the likelihood of malicious activity (e.g., higher honeypot activity can indicate a greater likelihood that the activity is malicious). Network identifier classification information 210 can include a type of network (e.g., a proxy, a virtual private network (VPN), Tor exit node, organizations associated with the network, etc.) from which the particular client device is accessing the networked resources of the computing platform and/or whether the network identifier is accessing the resources of the computing platform from within the computing platform. The type of network associated with the client device, as well as the organization associated with the type of network can indicate the likelihood of malicious vs. legitimate activity. For example, network identifier classification information 210 indicating that the network associated with the client device is associated with a reputable organization may indicate a lower likelihood of malicious activity, whereas network identifier classification information 210) indicating that the network is a Tor exit node may indicate a higher likelihood of malicious activity. Third-party and/or historical information 212 may include information, such as, third-party threat level intelligence information associated with the client device and/or a prefix associated with the client device, such as an autonomous system number (ASN), crowd-sourced information associated with the client device, previous detections of malicious activity associated with the client device, previously determined reputation scores associated with the client device, and the like.

In certain exemplary implementations, the various network telemetry information may be processed to determine corresponding network telemetry features for the network telemetry information. For example, in connection with authentication information 202, information and/or data may be obtained from multiple data sources indicating authentication events (e.g., log-in, certificate authentication, etc.) recorded during a preceding time period (e.g., 1 hour, 12 hours, 24 hours, 36 hours, etc.). Whether such an authentication event was recorded in the specified time period, the number of such authentication events, a frequency, and the like can be processed to determine the corresponding network telemetry feature associated with authentication information 202. Outbound traffic and/or connection information and/or data recorded over a specified time period also may be processed to determine a corresponding network telemetry feature associated with outbound traffic information 204. For example, connection and/or traffic information relating to connections on TCP/113 (e.g., TCP port 113), which can be indicative of malicious activity may be filtered, and ratios comparing a cumulative number of bytes to a total number of connections (e.g., a relatively low number of bytes can be indicative of malicious activity since legitimate outbound traffic may typically require a relatively larger number of bytes), a number of accounts and/or instances (e.g., of a virtual machine) receiving the outbound connections, and the like may be processed (e.g., compared against threshold values, etc.) to determine the corresponding network telemetry feature associated with outbound traffic information 204. Similarly, web connection/activity information and/or data recorded over a specified time period also may be processed to determine a corresponding network telemetry feature associated with web activity information 206. For example, HTTP and/or HTTPS activity and/or traffic (e.g., via ports 80/443), as well as potentially scanning activity, can be obtained, and ratios comparing the HTTP and/or HTTPS activity to potentially scanning activity, and the like may be processed (e.g., compared against threshold values, etc.) to determine the corresponding network telemetry feature associated with web activity information 206. The corresponding network telemetry features can also be determined and stored in connection with honeypot activity information 208, network identifier classification information 210, and/or third-party and/or historical information 212. For example, honeypot connection information, frequency, etc. as well as the type of network from which the particular client device is accessing the networked resources of the computing platform, historical and third-party information associated with the client device, and the like may be processed (e.g., against threshold values, etc.) to determine corresponding network telemetry features in connection with honeypot activity information 208, network identifier classification information 210, and/or third-party and/or historical information 212.

In operation, reputation and/or confidence scoring service 200 may obtain network identifier 214, for which reputation and/or confidence score 222 is to be determined. For example, network identifier 214 may be obtained (e.g., via an application programming interface (API), etc.) in connection with a request for information and/or a reputation score associated with network identifier 214, the detection of potentially malicious activity in connection with the client device identified by network identifier 214, and the like, and reputation and/or confidence score 222 can represent a likelihood of a threat presented by the client device identified by network identifier 214 and/or that the identified potentially malicious activity associated with network identifier 214 is malicious and/or is potentially impacting legitimate activity if remediation actions are taken, respectively.

In response to obtaining network identifier 214, reputation and/or confidence scoring service 200 may access, retrieve, and/or otherwise obtain any network telemetry information and/or corresponding network telemetry features stored and maintained in datastore 250) that had been collected in connection with network identifier 214. In the illustrated implementation in FIG. 2, reputation and/or confidence scoring model 220 may obtain: authentication information 202 associated with network identifier 214, which may include and/or be processed to obtain a representative value indicating whether an authentication event was recorded in connection with network identifier 214 in a predefined time period (e.g., 1 hour, 12 hours, 24 hours, 36 hours, etc.) preceding the detection of the potentially malicious activity: outbound traffic information 204 associated with network identifier 214, which may include and/or be processed to obtain a representative value indicating whether the outbound connections from network identifier 214 to certain networked resources (e.g., certain cloud computing services, applications, and the like) were considered to be legitimate during a second predefined time period (e.g., 15 minutes, 30) minutes, 45 minutes, 1 hour, 2 hours, etc.) preceding the detection of the potentially malicious activity: web activity information 206 associated with network identifier 214, which may include and/or be processed to obtain a representative value indicating whether web activity was recorded (e.g., HTTP and/or HTTPS connections via ports 80 and 443) in connection with network identifier 214 was considered to be legitimate activity during a third time period preceding the detection of the potentially malicious activity: honeypot activity information 208 associated with network identifier 214, which may include and/or be processed to obtain a representative value indicating whether connections from network identifier 214 to honeypots were recorded in a fourth time period (e.g., 15 minutes, 30) minutes, 45 minutes, 1 hour, 2 hours, etc.) preceding the detection of the potentially malicious activity: network identifier classification information 210 associated with network identifier 214, which may indicate a type of network associated with network identifier 214 (e.g., virtual private network (VPN), Tor exit node, organizations associated with the network, etc.) and/or whether it is internal to the computing platform: third-party and/or historical information 212, which may include information, such as, third-party threat level intelligence information associated with the client device and/or a prefix associated with the client device, such as an autonomous system number (ASN), crowd-sourced information associated with the client device, previous detections of malicious activity associated with the client device, previously determined reputation scores associated with the client device; and the like. Alternatively, reputation and/or confidence scoring service 200 may process one or more of authentication information 202, outbound traffic information 204, web activity information 206, honeypot activity information 208, network identifier classification information 210, and/or third-party and/or historical information 212 associated with network identifier 214 to determine corresponding network telemetry features for one or more of authentication information 202, outbound traffic information 204, web activity information 206, honeypot activity information 208, network identifier classification information 210, and/or third-party and/or historical information 212 associated with network identifier 214.

Accordingly, the retrieved network telemetry information and/or corresponding network telemetry features associated with network identifier 214 (e.g., authentication information 202 associated with network identifier 214, outbound traffic information 204 associated with network identifier 214, web activity information 206 associated with network identifier 214, honeypot activity information 208 associated with network identifier 214, network identifier classification information 210 associated with network identifier 214, third-party and/or historical information 212 associated with network identifier 214, and the like) may be processed by reputation and/or confidence scoring model 220 to determine reputation and/or confidence score 222 in response to a request and/or for the potentially malicious activity detected in connection with network identifier 214. The reputation score and/or confidence score may represent a likelihood that the activity associated with network identifier 214 is threatening, malicious, and/or legitimate, as well as the potential for impacting legitimate activity if remediation actions are to be taken. According to exemplary embodiments of the present disclosure, reputation and/or confidence scoring model 220 may employ a rule-based technique, one or more trained machine learning models, and/or other probabilistic techniques.

In an exemplary implementation, reputation and/or confidence scoring model 220 may employ a rule-based technique to determine the confidence score based on the retrieved network telemetry information. For example, reputation and/or confidence scoring model 220 may be configured with an initial reputation and/or confidence score, and the initial reputation and/or confidence score may be adjusted based on the retrieved network telemetry information. According to one exemplary implementation, corresponding network telemetry features associated with authentication information 202 associated with network identifier 214, outbound traffic information 204 associated with network identifier 214, web activity information 206 associated with network identifier 214, honeypot activity information 208 associated with network identifier 214 and/or network identifier classification information 210 associated with network identifier 214 may be processed, and based on the corresponding network telemetry features, the initial reputation and/or confidence score may be adjusted accordingly.

In an exemplary implementation where reputation and/or confidence scoring model 220 employs a rule-based technique and the corresponding network telemetry features employ Boolean values, if none of the Boolean values associated with and representing one or more of authentication information 202 associated with network identifier 214, outbound traffic information 204 associated with network identifier 214, web activity information 206 associated with network identifier 214, honeypot activity information 208 associated with network identifier 214, network identifier classification information 210 associated with network identifier 214, and/or third-party and/or historical information 212 associated with network identifier 214 have a value of one, the initial reputation and/or confidence score may not be adjusted. If one of the Boolean values associated with and representing one or more of authentication information 202 associated with network identifier 214, outbound traffic information 204 associated with network identifier 214, web activity information 206 associated with network identifier 214, honeypot activity information 208 associated with network identifier 214, network identifier classification information 210 associated with network identifier 214, and/or third-party and/or historical information 212 associated with network identifier 214 have a value of one, the reputation and/or initial confidence score may be adjusted by a first value. Similarly, if two of the Boolean values associated with and representing one or more of authentication information 202 associated with network identifier 214, outbound traffic information 204 associated with network identifier 214, web activity information 206 associated with network identifier 214, honeypot activity information 208 associated with network identifier 214, network identifier classification information 210 associated with network identifier 214, and/or third-party and/or historical information 212 associated with network identifier 214 have a value of one, the initial reputation and/or confidence score may be adjusted by a second value, and if three of the Boolean values associated with and representing one or more of authentication information 202 associated with network identifier 214, outbound traffic information 204 associated with network identifier 214, web activity information 206 associated with network identifier 214 honeypot activity information 208 associated with network identifier 214, network identifier classification information 210 associated with network identifier 214, and/or third-party and/or historical information 212 associated with network identifier 214 have a value of one, the initial reputation and/or confidence score may be adjusted by a third value, and so on. Accordingly, the adjusted initial reputation and/or confidence score in view of the network telemetry information may be provided as reputation and/or confidence score 222. Alternatively and/or in addition, honeypot activity information 208 associated with network identifier 214, network identifier classification information 210 associated with network identifier 214, and/or third-party and/or historical information 212 associated with network identifier 214 may be excluded from the determination of reputation and/or confidence score 222, but may be utilized to determine a maliciousness score representing a likelihood that the potentially malicious activity is actually malicious, prioritize (or deprioritize) detections of potentially malicious activity, determine performance of reputation and/or confidence scoring model 220 (and malicious activity detection services), and the like.

Figure 3:
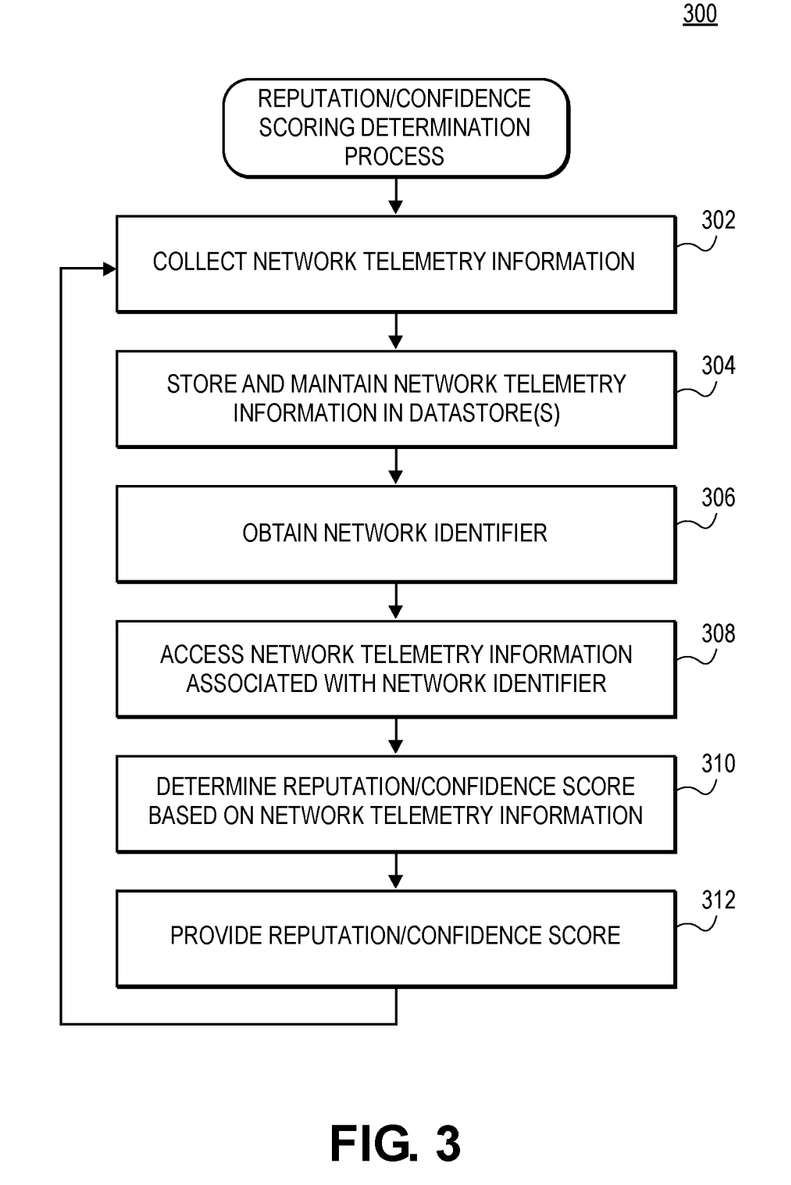
FIG. 3 is a flow diagram of an exemplary reputation and/or confidence scoring determination process, according to exemplary embodiments of the present disclosure.

FIG. 3 is a flow diagram illustrating an exemplary reputation and/or confidence scoring determination process 300, according to exemplary embodiments of the present disclosure.

As shown in FIG. 3, process 300 may begin with the collection of network telemetry information, as in step 302. The collected network telemetry information may be associated with client devices that are connecting to, accessing, and/or otherwise communicating with a networked computing platform, such as a cloud computing platform. According to exemplary embodiments of the present disclosure, the network telemetry information can include information relating to authentication events associated with the client devices, outbound traffic from the client devices, web activity associated with the client devices, honeypot activity associated with the client devices, client device network classification information, and/or third-party and/or historical information. The network telemetry information may be periodically and continuously obtained from various sources (e.g., network logging services, network monitoring services, fraud detection services, third-party network services, and the like) in batch.

According to exemplary embodiments, the authentication information may include data regarding whether an authentication event (e.g., log-in, certificate authentication, etc.) was recorded in connection with a particular client device within a preceding time period (e.g., 1 hour, 12 hours, 24 hours, 36 hours, etc.); outbound traffic information may include information regarding outbound connections from the particular client device to certain networked resources were recorded (e.g., certain cloud computing services, applications, and the like) within a preceding time period (e.g., 15 minutes, 30 minutes, 45 minutes, 1 hour, 2 hours, etc.). According to certain aspects of the present disclosure, the outbound traffic information can also include ratios comparing a cumulative number of bytes to a total number of connections (e.g., a relatively low number of bytes can be indicative of malicious activity since legitimate outbound traffic may typically require a relatively larger number of bytes), a number of accounts and/or instances (e.g., of a virtual machine) receiving the outbound connections, and the like. The web activity information may include information regarding HTTP and/or HTTPS traffic (e.g., via ports 80/443) within a preceding time period from the particular client device, as well as a ratio of HTTP and/or HTTPS traffic to activity on ports typically associated with scanning activity. The honeypot activity information can include an indication of whether, and how many, connections to honeypots were recorded in a preceding time period (e.g., 15 minutes, 30 minutes, 45 minutes, 1 hour, 2 hours, etc.). The network identifier classification information can include a type of network (e.g., if it is local to the networked computing platform, a proxy network, a virtual private network (VPN), Tor exit node, organizations associated with the network, etc.) from which the particular client device is accessing the networked resources of the networked computing platform, and the third-party and/or historical information associated with the network identifier (e.g., threat level intelligence information associated with the network identifier and/or a prefix, such as an autonomous system number (ASN), crowd-sourced information associated with the network identifier, previous detections of malicious activity associated with the network identifier, previously determined reputation scores associated with the network identifier, etc.

In step 304, the collected network telemetry information may be stored and maintained in one or more datastores. According to exemplary embodiments of the present disclosure, the stored network telemetry information may include the actual network telemetry information and/or data, corresponding network telemetry features representing a likelihood that the corresponding network telemetry information indicates a likelihood of a threat and/or malicious or legitimate activity, and the like. Accordingly, each type of acquired network telemetry information and/or corresponding network telemetry feature may provide insight regarding a likelihood that certain activity associated with a client device is threatening, malicious, and/or potentially impacting legitimate activity.

As shown in FIG. 3, in exemplary implementations of the present disclosure, a network identifier may be obtained, as in step 306. For example, the network identifier may be obtained (e.g., via an application programming interface (API), etc.) in connection with the detection of potentially malicious activity in connection with the client device identified by the network identifier, a query to obtain information in connection with activities associated with the network identifier, a request to determine a reputation associated with the network identifier, and the like. After the network identifier has been obtained, network telemetry information and/or corresponding network telemetry features associated with the network identifier may be accessed and obtained, as in step 308. For example, the network telemetry information associated with the network identifier may include information regarding whether there were certain authentication events recorded in connection with the network identifier within a certain timeframe, whether there was certain outbound traffic activity (e.g., connections to certain resources, number of accounts and/or instances accessed, ratio of bytes to connections, etc.) associated with the network identifier recorded during a certain timeframe, whether there was certain web activity (e.g., HTTP and/or HTTPS connections via ports 80/443, ratio of web activity to scanning activity, etc.) associated with the network identifier recorded during a certain timeframe, whether certain honeypot activity (e.g., connections and/or number of connections, etc.) associated with the network identifier recorded during a certain timeframe, a classification of the network associated with the network identifier, the third-party and/or historical information, and the like.

In step 310, the network telemetry information and/or the corresponding network telemetry features associated with the network identifier may be used to determine a reputation score and/or a confidence score for the network identifier. The reputation score may represent a likelihood that the network identifier presents a threat and/or the confidence score may represent a likelihood that the activity associated with the network identifier is malicious and/or legitimate, as well as the potential for impacting legitimate activity if remediation actions are to be taken. According to exemplary embodiments of the present disclosure, a reputation and/or confidence scoring model may be utilized to process the network telemetry information to determine the reputation score and/or confidence score. The reputation and/or confidence scoring model may employ a rule-based technique, one or more trained machine learning models, and/or other probabilistic techniques.

In an exemplary implementation, the reputation and/or confidence scoring model may employ a rule-based technique to determine the reputation score and/or confidence score based on the retrieved network telemetry information and/or the corresponding network telemetry features. For example, the reputation and/or confidence scoring model may employ a rule-based technique where it is configured with an initial reputation score and/or confidence score, and the initial reputation score and/or confidence score may be adjusted based on the retrieved network telemetry information and/or corresponding network telemetry features. According to other exemplary implementations, at least one of the raw network telemetry information, the corresponding network telemetry feature, and the like may be processed by one or more machine learning and/or other probabilistic techniques which may be employed by the reputation and/or confidence scoring model to generate the reputation score and/or confidence score for the network identifier. The reputation score and/or the confidence score may then be provided, as in step 312, to downstream and/or other services and/or processes (e.g., to perform a remediation action, determine a reputation score, respond to a query, and the like.). Alternatively and/or in addition, the network telemetry information and/or the network telemetry features may be provided in addition to and/or in lieu of the reputation score and/or the confidence score in response to the request and/or query to additional downstream services and/or systems for further processing and/or assessment.

Figure 4:
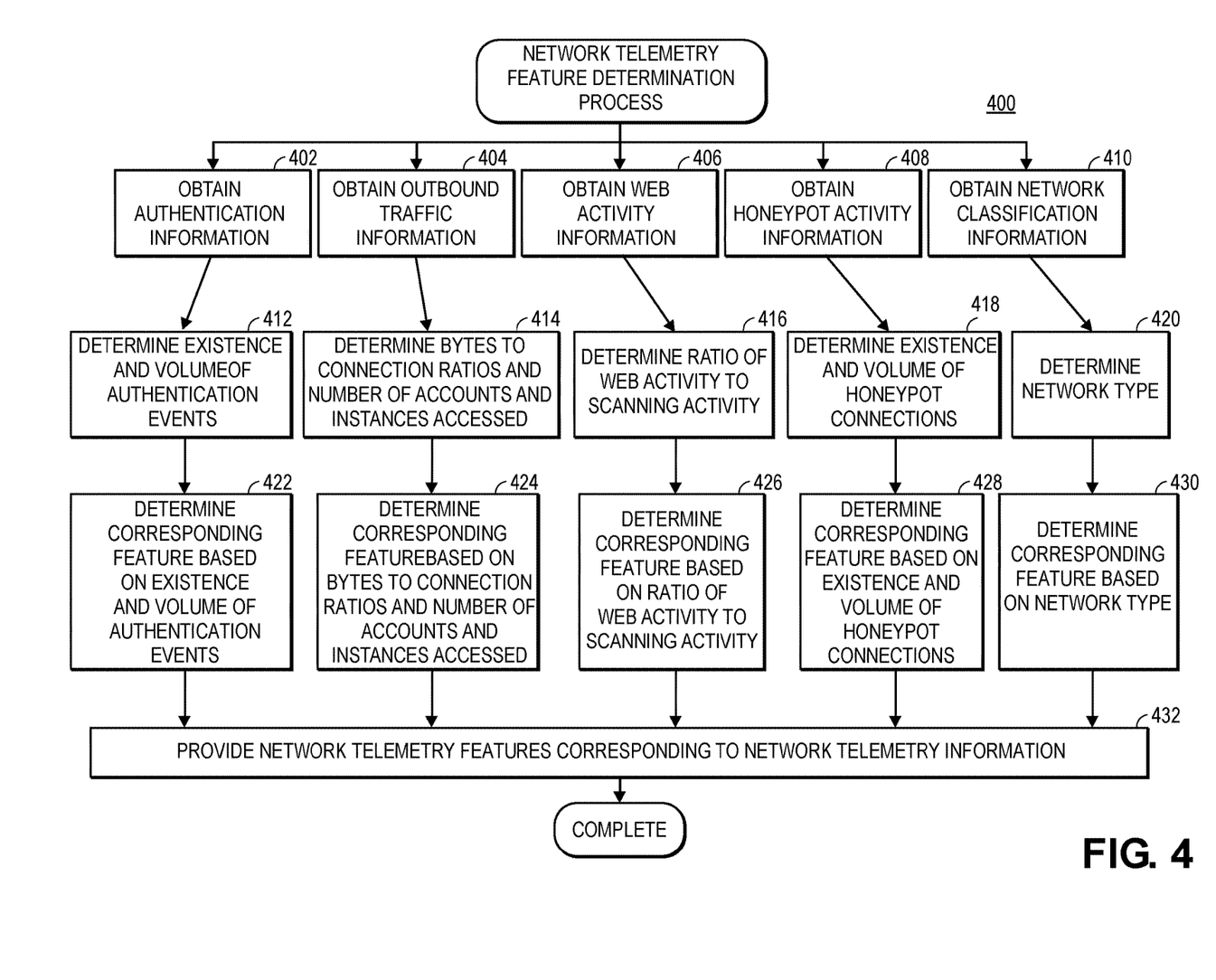
FIG. 4 is a flow diagram of an exemplary network telemetry feature determination process, according to exemplary embodiments of the present disclosure.

FIG. 4 is a flow diagram illustrating an exemplary network telemetry feature determination process 400, according to exemplary embodiments of the present disclosure.

As shown in FIG. 4, process 400 may begin with the collection of network telemetry information associated with a network identifier, as in steps 402, 404, 406, and 408. Specifically, authentication information associated with the network identifier may be obtained in step 402, outbound traffic information associated with the network identifier may be obtained in step 404, web activity information associated with the network identifier may be obtained in step 406, honeypot activity information associated with the network identifier may be obtained in step 408, and network classification information associated with the network identifier may be obtained in step 410.

In connection with the authentication information, in step 412, it may be determined whether any authentication events were recorded during a specified time frame and/or the number of authentication events that were recorded during the time frame. Based on the existence of and/or the volume of authentication events, in step 422, a corresponding feature may be determined in connection with the authentication information. For example, in exemplary implementations where a Boolean value is determined, a value of one may be assigned if any authentication events were recorded, and a value of zero may be assigned if no authentication events were detected. In an exemplary implementation where a probabilistic value is determined, the volume of authentication events, a pattern of authentication events, whether failed authentication events (as well as a pattern and/or volume of failed authentication events), and the like may be processed to determine a probabilistic value representative of a likelihood that the authentication information corresponds to threatening, legitimate and/or malicious activity, and the like.

In connection with the outbound traffic information, in step 414, filtering of connections made via certain ports (e.g., TCP/113) may be performed, a number of outbound connections made, a cumulative number of bytes transmitted via the connections, a ratio of the cumulative number of bytes to the number of connections, the number of accounts and/or instances accessed, the type of accounts and/or instances accessed, and the like may be determined over a specified time period. Based on the existence of and/or the volume of outbound connections made, the number of bytes transmitted via the connections, the ratio of the cumulative number of bytes to the number of connection the number of accounts and/or instances accessed, the type of accounts and/or instances accessed, in step 424, a corresponding feature may be determined in connection with the outbound traffic information. For example, in exemplary implementations where a Boolean value is determined, a value of one may be assigned if the ratio of the cumulative number of bytes to the number of connections is above a threshold and/or a number of accounts and/or instances accessed is above a threshold, and a value of zero may be assigned otherwise. In an exemplary implementation where a probabilistic value is determined, the existence of and/or the volume of outbound connections made, the number of bytes transmitted via the connections, the ratio of the cumulative number of bytes to the number of connections, the number of accounts and/or instances accessed, the type of accounts and/or instances accessed, a pattern of outbound activity, and the like may be processed to determine a probabilistic value representative of a likelihood that the outbound traffic information corresponds to legitimate and/or malicious activity.

In connection with the web activity information, in step 416, whether any web activity (e.g., HTTP and/or HTTPS activity on ports 80/443) was recorded during a specified time frame, the volume of such web activity, a ratio of the web activity to scanning activity, and the like may be determined. Based on the existence of and/or the volume of web activity (e.g., HTTP and/or HTTPS activity on ports 80/443), and/or a ratio of the web activity to scanning activity, in step 426, a corresponding feature may be determined in connection with the authentication information. For example, in exemplary implementations where a Boolean value is determined, a value of one may be assigned if the ratio of the web activity to scanning activity is above a threshold value. In an exemplary implementation where a probabilistic value is determined, recorded web activity (e.g., HTTP and/or HTTPS activity on ports 80/443), the volume of such web activity, a ratio of the web activity to scanning activity, web activity patterns, and the like may be processed to determine a probabilistic value representative of a likelihood that the web activity information corresponds to legitimate and/or malicious activity.

In connection with the honeypot activity information, in step 418, it may be determined whether any connections to honeypots were recorded during a specified time frame and/or the number of honeypot connection that were recorded during the time frame. Based on the existence of and/or the volume of honeypot connections, in step 428, a corresponding feature may be determined in connection with the honeypot activity information. For example, in exemplary implementations where a Boolean value is determined, a value of one may be assigned if any honeypot connections were recorded, and a value of zero may be assigned if no honeypot connections were detected. In an exemplary implementation where a probabilistic value is determined, the volume of honeypot connections, a pattern of honeypot connections, and the like may be processed to determine a probabilistic value representative of a likelihood that the honeypot activity information corresponds to legitimate and/or malicious activity.

In connection with the network classification information, in step 420, the type of network associated with the network identifier may be determined. Based on the type of network associated with the network identifier, in step 430, a corresponding feature may be determined in connection with the network classification information. For example, in exemplary implementations where a Boolean value is determined, a value of one may be assigned for certain network classification types. In an exemplary implementation where a probabilistic value is determined, the network classification type (e.g., VPN, proxy, Tor exit node, associated organization, etc.) may be processed to determine a probabilistic value representative of a likelihood that the network classification information corresponds to legitimate and/or malicious activity.

After all the corresponding network telemetry features have been determined, in step 432, the corresponding network telemetry features may be provided and/or processed (e.g., by a reputation and/or confidence scoring model, etc.).

Figure 5:
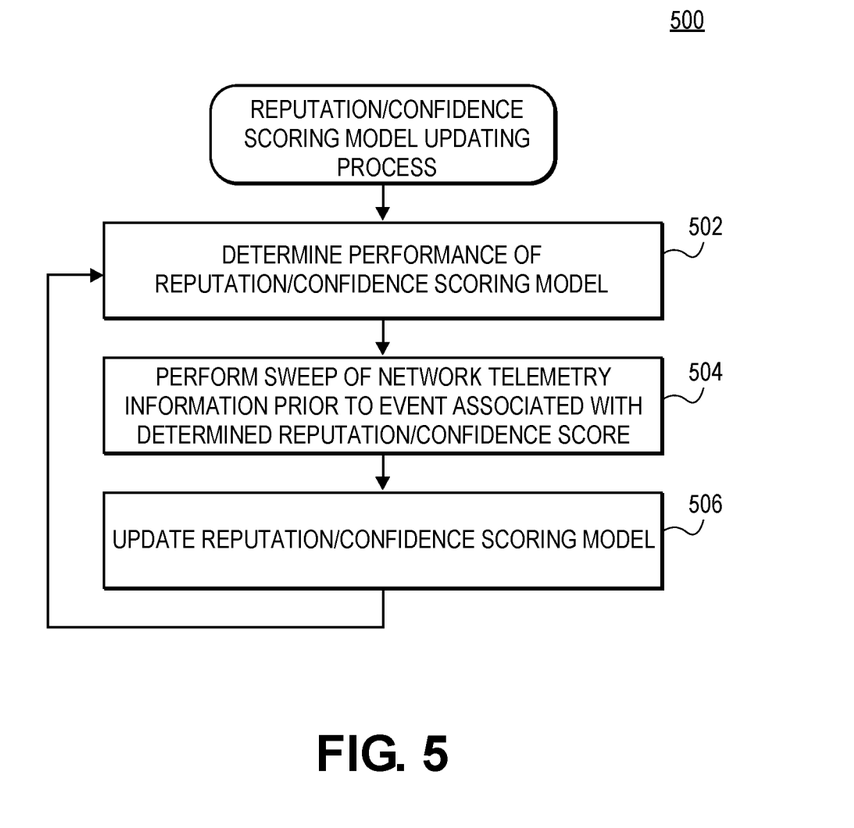
FIG. 5 is a flow diagram of an exemplary reputation and/or confidence scoring model updating process, according to exemplary embodiments of the present disclosure.

FIG. 5 is a flow diagram illustrating an exemplary reputation and/or confidence scoring model updating process 500, according to exemplary embodiments of the present disclosure.

As shown in FIG. 5, process 500 may begin at step 502, where a performance of the reputation and/or confidence scoring may be obtained. For example, reputation scores and/or confidence scores generated by the reputation and/or confidence scoring model in response to a query and/or request, in connection with the detection of potentially malicious activity associated with one or more network identifiers, and the like are used to determine the model's performance. The generated reputation scores and/or confidence scores can be processed to determine false positives, false negative, true positives, and/or true negatives (e.g., in connection with the detection of malicious activity, impact to legitimate behavior, etc.). The false positives, false negatives, true positives, and/or true negatives can be processed to determine performance metrics (e.g., precision, recall, false positive rate, and the like).

Based on the determined performance of the reputation and/or confidence scoring model, a sweep of network telemetry information prior to the events (e.g., false positives, false negatives, true positives, and/or true negatives, etc.) associated with the determination of a reputation score and/or confidence score in connection with a network identifier may be performed, as in step 504. For example, the sweep of network telemetry information may obtain network telemetry information similar to the network telemetry information obtained and processed in connection with the determination of a reputation score and/or confidence score, such as authentication information, outbound traffic information, web activity information, honeypot activity information, network classification information, third-party and/or historical information, and the like. However, the network telemetry obtained at step 504 in connection with updating a reputation and/or confidence scoring model may span a longer time period. For example, the sweep of network telemetry information may obtain network telemetry information obtained in connection with the network identifier over the preceding 12 hours, 1 day, 2 days, 3 days, 1 week, etc. Statistical analyses may be performed on the various network telemetry information (e.g., the volume and/or patters of authentication events, volume and/or patterns of failed authentication events, volume and/or patterns of outbound connections, ratios of the cumulative number of bytes to the number of connections, the number of accounts and/or instances accessed, the type of accounts and/or instances accessed, web activity (e.g., HTTP and/or HTTPS activity on ports 80/443) and/or a ratio of the web activity to scanning activity, volume and/or patterns of honeypot connections, network classification type, and the like. Based on the collected network telemetry information, the reputation and/or confidence scoring model may be updated, as in step 506.

Figure 6:
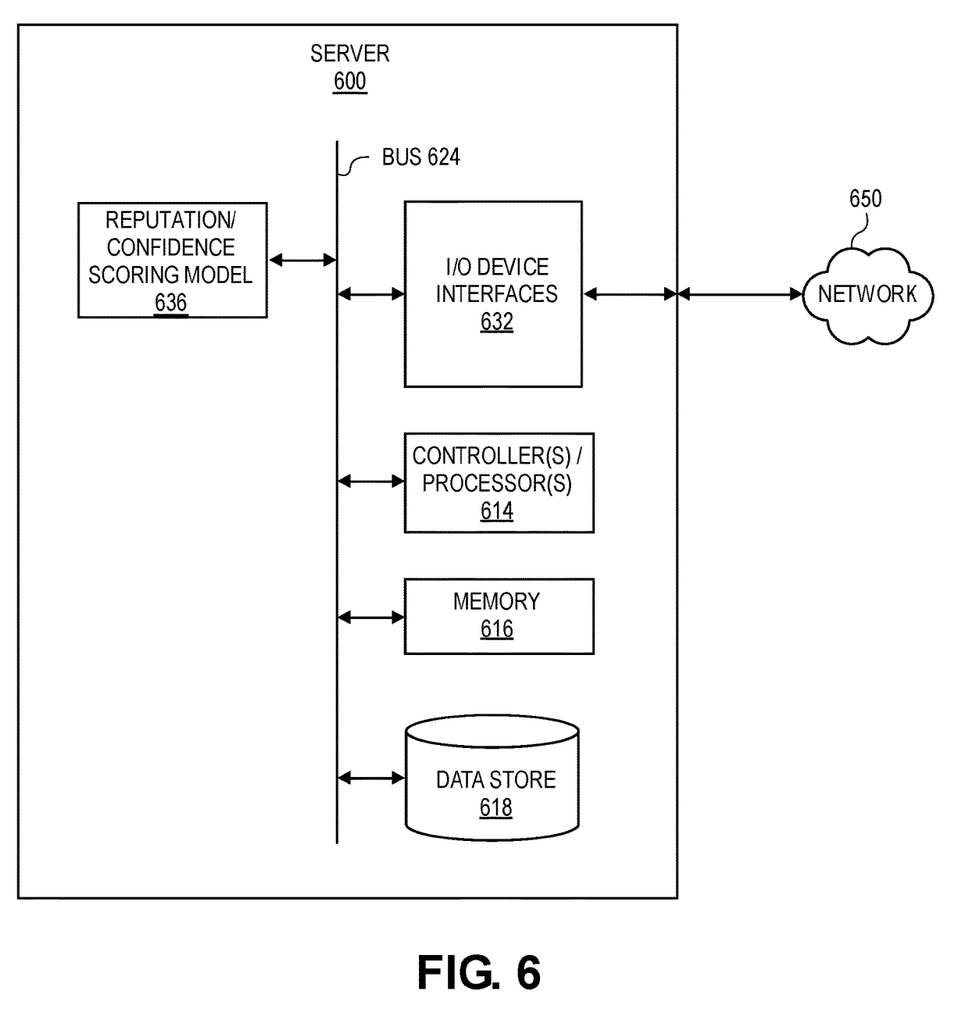
FIG. 6 is a block diagram of an exemplary server, according to exemplary embodiments of the present disclosure.

FIG. 6 is a block diagram conceptually illustrating example components of a remote computing device, such as remote server 600 that may include and/or execute one or more of the above discussed trained machine learning models, in accordance with described implementations. Multiple such servers 600 may be included in the system.

Each of server(s) 600 may include one or more controllers/processors 614, that may each include a central processing unit (CPU) for processing data and computer-readable instructions, and memory 616 for storing data and instructions. Memory 616 may individually include volatile random-access memory (RAM), non-volatile read only memory (ROM), non-volatile magnetoresistive (MRAM) and/or other types of memory. Each server may also include a data storage component 618, for storing data, controller/processor-executable instructions, training data, labels, network telemetry information, etc. Each data storage component 618 may individually include one or more non-volatile storage types such as magnetic storage, optical storage, solid-state storage, etc. Each server 600 may also be connected to removable or external non-volatile memory and/or storage (such as a removable memory card, memory key drive, networked storage, etc.), internal, and/or external networks 650 (e.g., the Internet) through respective input/output device interfaces 632.

Computer instructions for operating each server 600 and its various components may be executed by the respective server's controller(s)/processor(s) 614, using the memory 616 as temporary "working" storage at runtime. Server 600's computer instructions may be stored in a non-transitory manner in non-volatile memory 616, storage 618, and/or an external device(s). Alternatively, some or all of the executable instructions may be embedded in hardware or firmware on the respective device in addition to or instead of software.

Each server 600 includes input/output device interfaces 632. A variety of components may be connected through the input/output device interfaces. Additionally, each server 600 may include address/data bus 624 for conveying data among components of the respective server. Each component within server 600 may also be directly connected to other components in addition to (or instead of) being connected to other components across bus 624. Each server 600 may also include one or more reputation and/or confidence scoring models 636, as discussed herein.

The components of the server(s) 600, as illustrated in FIG. 6, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 3-5, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z." or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   obtaining a first plurality of network telemetry information associated with a plurality of client devices accessing a networked computing platform, wherein the first plurality of network telemetry information includes a first plurality of authentication information, a first plurality of outbound traffic information, a first plurality of web activity information, a first plurality of honeypot activity information, a first plurality of network classification information, and a first plurality of third-party threat intelligence information;
   storing the first plurality of network telemetry information in one or more datastores;
   obtaining a network identifier associated with a first client device of the plurality of client devices;
   obtaining a second plurality of network telemetry information of the first plurality of network telemetry information, wherein the second plurality of network telemetry information is associated with the network identifier and includes a second plurality of authentication information of the first plurality of authentication information, a second plurality of outbound traffic information of the first plurality of outbound traffic information, a second plurality of web activity information of the first plurality of web activity information, a second plurality of honeypot activity information of the first plurality of honeypot activity information, a second plurality of network classification information of the first plurality of network classification information, and a second plurality of third-party threat intelligence information of the first plurality of third-party threat intelligence information; and
   processing, using a confidence scoring model, at least one of the second plurality of authentication information, the second plurality of outbound traffic information, the second plurality of web activity information, the second plurality of honeypot activity information, the second plurality of network classification information, or the second plurality of third-party threat intelligence information to generate at least one of a reputation score or a confidence score associated with the network identifier.

2. The computer-implemented method of claim 1, wherein the network identifier includes at least one of an Internet Protocol (IP) address, a transport layer security (TLS) identifier, a user agent, or a hash identifier.

3. The computer-implemented method of claim 1, wherein processing at least one of the second plurality of authentication information, the second plurality of outbound traffic information, the second plurality of web activity information, the second plurality of honeypot activity information, the second plurality of network classification information, or the second plurality of third-party threat intelligence information includes generating at least one network telemetry feature corresponding to at least one of the second plurality of authentication information, the second plurality of outbound traffic information, the second plurality of web activity information, the second plurality of honeypot activity information, the second plurality of network classification information, or the second plurality of third-party threat intelligence information.

4. The computer-implemented method of claim 3, wherein the at least one network telemetry feature includes:
   an authentication network feature including a first indicator representing an authentication event associated with the network identifier within a first period of time;
   an outbound traffic feature including a second indicator representing that a number of accessed accounts associated with the network identifier is above a first threshold during a second period of time; and
   a web activity feature including a third indicator representing that a ratio of web activity to scanning activity associated with the network identifier during a third period of time is above a second threshold.

5. The computer-implemented method of claim 1, wherein obtaining of the network identifier associated with the first client device includes an indication of potentially malicious activity associated with the network identifier.

6. A computing system, comprising:
one or more processors;
a memory storing program instructions that, when executed by the one or more processors, cause the one or more processors to at least:
  obtain an authentication feature associated with a network identifier indicating whether an authentication event associated with the network identifier occurred within a first period of time;
  obtain an outbound traffic feature associated with the network identifier indicating whether a number of accessed accounts associated with the network identifier during a second period of time is above a first threshold;
  obtain a web activity feature associated with the network identifier indicating whether a ratio of web activity to scanning activity associated with the network identifier during a third period of time is above a second threshold; and
  determine, based at least in part on at least one of the authentication feature, the outbound traffic feature, or the web activity feature, at least one of:
    a reputation score representing a first likelihood of a threat associated with the network identifier; or
    a confidence score representing a second likelihood of legitimate activity associated with the network identifier.

7. The computing system of claim 6, wherein determination of the confidence score is performed by a rule-based confidence scoring model configured to adjust an initial confidence score based on the authentication feature, the outbound traffic feature, and the web activity feature.

8. The computing system of claim 6, wherein the program instructions, that when executed by the one or more processors, further cause the one or more processors to at least:
  obtain authentication information associated with the network identifier from a plurality of authentication information, wherein the authentication feature is generated from the authentication information;
  obtain outbound traffic information associated with the network identifier from a plurality of outbound traffic information, wherein the outbound traffic feature is generated from the outbound traffic information; and
  obtain web activity information associated with the network identifier, wherein the web activity feature is generated from the web activity information.

9. The computing system of claim 8, wherein:
the authentication information is obtained from a plurality of authentication information associated with a plurality of network identifiers;
the outbound traffic information is obtained from a plurality of outbound traffic information associated with the plurality of network identifiers; and
the web activity information is obtained from a plurality of web activity information associated with the plurality of network identifiers.

10. The computing system of claim 8, wherein determination of the confidence score is performed by a trained machine learning confidence scoring model configured to determine the confidence score based on at least one of the authentication feature, the authentication information, the outbound traffic feature, the outbound traffic information, the web activity feature, or the web activity information.

11. The computing system of claim 6, wherein a potential port scanning event was detected in connection with the network identifier.

12. The computing system of claim 11, wherein:
the program instructions, that when executed by the one or more processors, further cause the one or more processors to at least:
  obtain a honeypot activity feature associated with the network identifier indicating honeypot connection activity associated with the network identifier during a fourth period of time; and
  obtain a network classification feature associated with the network identifier indicating a network classification type associated with the network identifier; and
determine a maliciousness score representing a likelihood that the potential port scanning is an actual port scanning event.

13. The computing system of claim 12, wherein determination of at least one of the reputation score or the confidence score is further based on at least one of the honeypot activity feature or the network classification feature.

14. The computing system of claim 12, wherein the program instructions, that when executed by the one or more processors, further cause the one or more processors to at least:
  obtain honeypot activity information associated with the network identifier from a plurality of honeypot activity information associated with a plurality of network identifiers, wherein the honeypot activity feature is generated from the honeypot activity information; and
  obtain network classification information associated with the network identifier from a plurality of network classification information associated with the plurality of network identifiers, wherein the network classification feature is generated from the network classification information.

15. The computing system of claim 6, wherein the network identifier includes at least one of an Internet Protocol (IP) address, a transport layer security (TLS) identifier, a user agent, or a hash identifier.

16. A computer-implemented method, comprising:
obtaining an indication of potentially malicious activity associated with a network identifier;
obtaining authentication information associated with the network identifier from a plurality of authentication information associated with a plurality of network identifiers;
obtaining outbound traffic information associated with the network identifier from a plurality of outbound traffic information associated with a plurality of network identifiers;
obtaining web activity information with the network identifier indicating from a plurality of web activity information associated with a plurality of network identifiers;
processing, using a confidence scoring model, at least one of the authentication information, the outbound traffic information, or the web activity information, to generate a confidence score representing a likelihood of legitimate activity associated with the network identifier; and
initiating, based at least in part on the confidence score, a remediation action against the network identifier.

17. The computer-implemented method of claim 16, further comprising:
processing the authentication information to generate an authentication feature associated with the network identifier representing a likelihood that authentication activity associated with the network identifier indicates legitimate activity;

processing the outbound traffic information to generate an outbound traffic feature associated with the network identifier representing a likelihood that outbound traffic activity associated with the network identifier indicates legitimate activity; and processing the web activity information to generate a web activity feature associated with the network identifier representing a likelihood that web activity associated with the network identifier indicates legitimate activity, wherein determining the confidence score is based at least in part on the authentication feature, the outbound traffic feature, and the web activity feature.

18. The computer-implemented method of claim 17, wherein the confidence scoring model includes a rule-based confidence scoring model configured to adjust an initial confidence score based on the authentication feature, the outbound traffic feature, and the web activity feature.

19. The computer-implemented method of claim 16, further comprising:

obtaining honeypot activity information associated with the network identifier from a plurality of honeypot activity information;

obtaining network classification information associated with the network identifier from a plurality of network classification information; and determining, based at least in part on the honeypot activity information and the network classification information, a likelihood that the potentially malicious activity associated with the network identifier is actually malicious activity.

20. The computer-implemented method of claim 16, wherein:

the authentication information includes authentication activity associated with the network identifier during a first time period preceding the potentially malicious activity;

the outbound traffic information includes outbound traffic activity associated with the network identifier during a second time period preceding the potentially malicious activity;

the web activity information includes web activity associated with the network identifier during a third time period preceding the potentially malicious activity;

and the computer-implemented method further comprises:

determining a performance of the confidence score;

obtaining a plurality of network telemetry information associated with the network identifier, wherein the plurality of network telemetry information includes:

authentication activity associated with the network identifier during a fourth time period that is greater than the first time period:

outbound traffic activity associated with the network identifier during a fifth time period that is greater than the second time period:

web activity associated with the network identifier during a sixth time period that is greater than the third time period; and updating, based at least in part on the performance of the confidence score, the authentication activity, the outbound traffic activity, and the web activity, the confidence scoring model.

\* \* \* \* \*